No. 820,150. PATENTED MAY 8, 1906.
A. M. STRIPLIN.
FRUIT CUTTING, PITTING, AND SPREADING DEVICE.
APPLICATION FILED APR. 24, 1905.
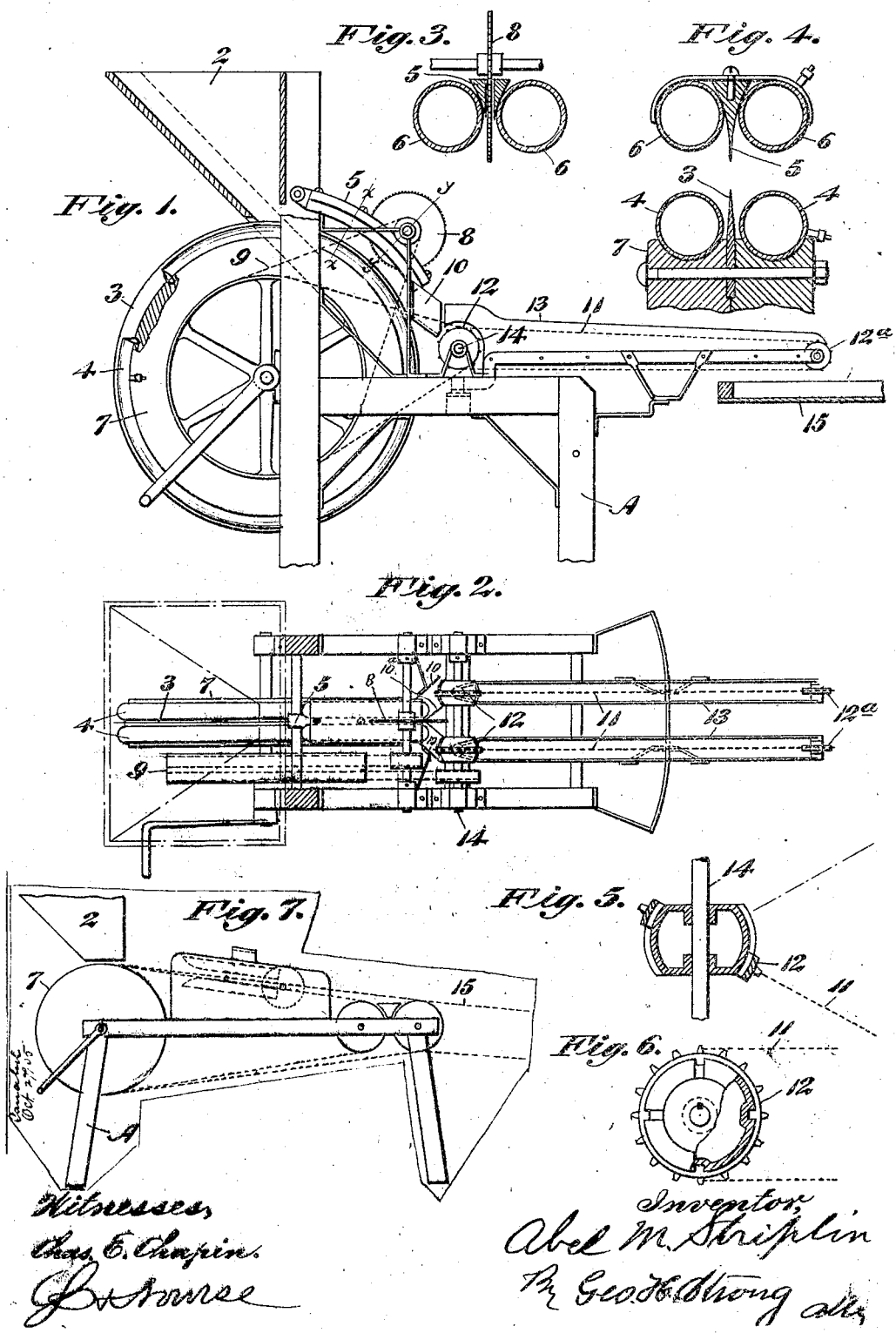

UNITED STATES PATENT OFFICE.

ABEL M. STRIPLIN, OF ESCONDIDO, CALIFORNIA.

FRUIT CUTTING, PITTING, AND SPREADING DEVICE.

No. 820,150.

Specification of Letters Patent.

Patented May 8, 1906.

Application filed April 24, 1905. Serial No. 257,196.

*To all whom it may concern:*

Be it known that I, ABEL M. STRIPLIN, a citizen of the United States, residing at Escondido, in the county of San Diego and State of California, have invented new and useful Improvements in Fruit Cutting, Pitting, and Spreading Devices, of which the following is a specification.

My invention relates to an apparatus which is designed for cutting fruits around the pits contained therein, separating the meats from the pits, and spreading it for drying or other purposes.

It consists in a combination of mechanism and in details of construction, which will be more fully explained by reference to the accompanying drawings, in which—

Figure 1 is a side elevation of my device, partly in section. Fig. 2 is a side view of the same. Fig. 3 is a sectional view on the line $y\ y$ of Fig. 1. Fig. 4 is a sectional view on the line $x\ x$ of Fig. 1. Fig. 5 is a sectional view taken through the ball-joint. Fig. 6 is an elevation of the drum 12, partially broken away.

It is the object of my invention to provide an automatically-operating apparatus by which the fruit, such as peaches and the like, containing an interior pit or stone, may be first split, then separated from the stone or pit, which is removed from between the separated sides. The latter are then delivered by distributers upon drying-tables or the like. This operation may be effected in the following manner:

As shown in the drawings, A is a frame of any suitable or desired construction, and 2 is a receiver or hopper mounted upon the frame and having an opening in the bottom through which the fruit may be delivered by a suitable chute to the pitting apparatus. This apparatus consists of a cutter 3 and elastic cushions 4, carried upon each side of the cutter. Above the cutter 3 is a second cutter and spreader 5 and another set of cushions, as at 6. This mechanism may be constructed either in a cylindrical form or extended in the form of traveling belts. As shown in Fig. 1, the cutter 3 and the cushions 4 are mounted upon a cylindrical drum or carrier 7, the shaft of which is journaled in the frame A, and this may be revolved by hand or by connection with any suitable motor. The cutter 3 in this case is in the form of a circular blade projecting from the periphery of the drum, and the cushions 4 are located upon each side of the cutter. These cushions are preferably made in the form of rubber tubes similar to those employed in bicycle and other tires, and these tubes will have the usual valves and means for inflating them to any desired degree of tension. The blade 5 is fixed at a distance above and in line with the blade 3 and is substantially concentric therewith. The distance between the two blades is equal to the diameter of the pits of the fruit to be operated on. The fruit then being delivered from the hopper or receiver 2 will pass singly through a chute and into contact with the blade 3. The revolution of the drum with the blade and cushions carries the fruit along and rolls it between the blades 3 and 5, thus cutting the fruit in half down to the pit. The cushions 4 and 6 by their elasticity compensate for the different sizes of fruit which may be passing through the apparatus and will prevent the bruising or crushing of the larger sizes. The blade 5 diverges outwardly from the cutting edge, and thus serves as a wedge to partially separate the two sides of the fruit from the pit. Through the back of the blade 5 a slot is made, and a circular saw 8 is journaled so that its edge passes through the slot and near enough to the cutting-blade 3 so that when the fruit has reached this point the edge of the saw will engage the pit and will roll it out and separate it from the two sides of the fruit, which are being held between the cushions 4 and 6. The revolution of the saw 8 is effected by a belt 9 from the drum 7 or a pulley turnable in unison therewith, and the speed of the saw 8 may be made sufficiently greater than that of the drum to insure its detaching the fruit from the pit as they pass. The pit will thus be ejected from between the two sides of the fruit and will fall to the ground in front of the drum 7.

Beyond the termination of the elastic tubes 6 and in continuation with the lower end of the upper blade 5 the sides of the device are diverged outwardly, as shown at 10 10$^a$, so that the two parts of the fruit from which the pit has been ejected will be carried outward between this portion 10 and the circular elastic cushions 4 and will be delivered upon carrying-belts, as at 11. These belts have their inner ends passing over drums, as at 12, and the outer ends over similar drums 12$^a$ at the termination of the troughs 13, in which they travel. The inner ends of these troughs are so pivoted or hinged that while power may be transmitted through the shaft 14 to drive the belts the belts and their supporting-troughs are movable about this inner end, so that the outer ends may be moved transversely across trays, as at 15, which are so disposed as to receive the fruit delivered by the distributing-belts. Thus this belt being in motion and the fruit being brought by the trays the latter may be moved from side to side, and the fruit thus delivered upon the final carrying-belts and properly laid thereon.

Having thus described my invention, what I claim, and desire to secure by Letters Patent, is—

1. In an apparatus for separating fruit from pits, the combination of a receiver or hopper having a bottom delivery-opening, cutters between which the fruit is delivered from the receiver and caused to roll, elastic cushions fixed upon the sides of the cutters to guide and support the passing fruit, and means for separating the pit from the fruit after the cutting has been effected.

2. In an apparatus for separating fruit from pits, the combination of a revoluble cutter, means for delivering the fruits singly into contact with its edge, cushions upon each side of the cutter upon which the two sides of the fruit are supported, a spreader located in line with the cutter, and a saw disposed in the path of the fruit and by which the stone is ejected from the fruit.

3. An apparatus for pitting fruit, said apparatus comprising a cutter by which the fruit is split, cushions located upon each side of the cutter, means for delivering fruits singly and causing them to roll over the cutter-surface whereby they are split, a revoluble saw in the path of the fruit and beneath which the cut fruit is passed, said saw acting to disengage the pit from the fruit, and distributers upon which the separated fruit is delivered.

4. In a fruit-pitting apparatus, the combination of a revoluble knife having cushions upon each side, means for delivering fruits singly in line with the knife, a second knife and spreader concentric with the first-named knife, a saw revoluble through a slot in the spreader and acting to eject the pit after the fruit is cut, distributing-belts located upon each side and beyond the saw and guides by which the fruit is delivered upon said belts.

5. A fruit pitting and distributing apparatus having in combination a revoluble cutter with cushions located upon each side, a stationary cutter and spreader concentric with and above the revoluble cutter, said stationary cutter having cushions located upon each side and in line with the revoluble cushions, a saw revoluble in line with the interior cutter to engage and eject the pits after the fruit is cut, divergent guides located below the saw, distributers consisting of endless traveling belts upon the inner ends of which the halves of the fruit are delivered, and from the outer ends of which the fruit may be discharged.

In testimony whereof I have hereunto set my hand in presence of two subscribing witnesses.

ABEL M. STRIPLIN.

Witnesses:
WILLIAM C. FOOTE,
R. E. LUSCOMB.